(12) United States Patent
Padmanabhan (10) Patent No.: US 11,837,223 B2
(45) Date of Patent: Dec. 5, 2023

(54) MANAGING SOFTWARE DEFINED NETWORKS USING HUMAN LANGUAGE

(71) Applicant: NOKIA SOLUTIONS AND NETWORKS OY, Espoo (FI)

(72) Inventor: Sowrirajan Padmanabhan, Chennai (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 256 days.

(21) Appl. No.: 17/127,592

(22) Filed: Dec. 18, 2020

(65) Prior Publication Data
US 2022/0199075 A1    Jun. 23, 2022

(51) Int. Cl.
| | | |
|---|---|---|
| G10L 15/22 | (2006.01) | |
| G10L 15/18 | (2013.01) | |
| G10L 15/06 | (2013.01) | |
| G06N 20/00 | (2019.01) | |
| G10L 15/30 | (2013.01) | |

(52) U.S. Cl.
CPC .............. G10L 15/22 (2013.01); G06N 20/00 (2019.01); G10L 15/063 (2013.01); G10L 15/1815 (2013.01); G10L 15/30 (2013.01); *G10L 2015/223* (2013.01)

(58) Field of Classification Search
CPC ... G10L 15/22; G10L 15/063; G10L 15/1815; G10L 15/30; G10L 2015/223; G10L 15/26; G06N 20/00; G06N 3/044; G06N 3/045; G06N 3/08; G06F 16/90332; G06F 40/284; G06F 40/30; H04L 41/0816; H04L 41/16; H04L 41/40
See application file for complete search history.

(56) References Cited

U.S. PATENT DOCUMENTS

| | | | |
|---|---|---|---|
| 10,769,166 B1* | 9/2020 | Hankins | G06F 16/254 |
| 2013/0275138 A1* | 10/2013 | Gruber | G10L 13/00 704/260 |
| 2015/0113133 A1* | 4/2015 | Srinivas | H04L 43/20 709/224 |
| 2018/0061399 A1* | 3/2018 | Rose | G10L 15/22 |
| 2020/0067851 A1* | 2/2020 | Yigit | H04L 41/16 |
| 2020/0092026 A1* | 3/2020 | Birk | H04L 45/08 |
| 2021/0051175 A1* | 2/2021 | Lyle | H04L 63/1416 |
| 2021/0092786 A1* | 3/2021 | Uddin | H04W 76/15 |
| 2022/0050955 A1* | 2/2022 | Awadalla | G06F 40/169 |

OTHER PUBLICATIONS

Michiaki Hayashi,".Machine Learning-assisted Management of a Virtualized Network," KDDI Research Inc, Optocal Fiber Conference, 2018.

(Continued)

*Primary Examiner* — Michael Colucci
(74) *Attorney, Agent, or Firm* — Kramer & Amado, P.C.

(57) ABSTRACT

A human language software defined network (SDN) control system, including: a voice to text machine learning model configured to convert user speech to text; a machine learning language processing engine configured to control the operation of a SDN controller based upon the text; and a machine learning minimal language processing engine configured to control the operation of a SDN element based upon commands from the SDN controller produced by the machine learning language processing engine.

24 Claims, 3 Drawing Sheets

(56) References Cited

OTHER PUBLICATIONS

RFC 2578—Structure of Management Information Version 2 (SMIv2) Apr. 1999.
RFC 2579—Textual Conventions for SMIv2—Apr. 1999.
RFC 6020—YANG—A Data Modeling Language for the Network Configuration Protocol (NETCONF) Oct. 2010.
RFC 7950—The YANG 1.1 Data Modeling Language—Aug. 2016.
AT&T Network Outage by Karl Bode—Aug. 29, 2002 http://www.dslreports.com/shownews/ATT-Network-Outage-21402.
Announcement Regarding Non-Cisco Product Security Alerts—Sep. 15, 2019 http://tools.cisco.com/security/center/viewAlert x?alertId=17657.
Misconfigured Cloud Services Pose High Security Risks for Organizations—Jun. 27, 2018 http://www.trendmicro.com/vinfo/mx/security/news/virtualization-andcloud/-misconfigured-cloud-services-pose-high-security-risks-fororganizations.
Nokia Launches Intent-based Solution that Allows Operators to Deploy Software Defined Access at their Own Pace—Oct. 9, 2019 https://www.nokia.com/about-us/news/releases/2019/10/09/nokialaunches-intent-based-solution-that-allows operators-to-deploysoftware-defined-access-at-their-own-pace.
Cisco Intent-Based Networking—Jun. 10, 2019 https://www.cisco.com/c/en_in/solutions/intent-based-networking.html.
Fred Aklamanu, Sabine Randriamasy, Eric Renault, Imran Latif and Abdelkrim Hebbar, "Intent-Based Real-Time 5G Cloud Service Provisioning", Nokia Bell Labs & Telecom SudParis.
The SDN architecture, issue 1.0, ONF TR-502, Jun. 2014, https://www.opennetworking.org/images/stories/downloads/sdnresources/technical-reports/TR_SDN_ARCH_1.0_06062014.p.

\* cited by examiner

MANAGING SOFTWARE DEFINED NETWORKS USING HUMAN LANGUAGE

TECHNICAL FIELD

Various exemplary embodiments disclosed herein relate generally to a system and method for managing software defined networks using human language.

BACKGROUND

Data models provide a structured representation of configuration and state data of telecommunication networks. With the evolution of Software Defined Networking (SDN) and the continuous push for generic solutions, defining generic data models rather than proprietary ones is now a reality. One of the benefits of having generic management models and protocols is the ability to develop management system solutions which can manage SDNs with multi-vendor equipment with ease. However, having such a unified model has its own share of disadvantages. For example, the inability to realize the full capabilities of the vendor systems and the need to heavily depend on standardization to ensure successful interoperation. Key differentiators are kept in proprietary models while only aligning to the common modeling language syntax.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a human language software defined network (SDN) control system, including: a voice to text machine learning model configured to convert user speech to text; a machine learning language processing engine configured to control the operation of a SDN controller based upon the text; and a machine learning minimal language processing engine configured to control the operation of a SDN element based upon commands from the SDN controller produced by the machine learning language processing engine.

Various embodiments are described, wherein voice to text machine learning model is implemented in a management function device.

Various embodiments are described, wherein the machine learning language processing engine is trained using information extracted from API definitions used in the SDN.

Various embodiments are described, wherein the machine learning language processing engine implements intent based networking.

Various embodiments are described, wherein the machine learning language processing engine implements one of provisioning new SDN services, changing the configuration of the SDN, changing the configuration of the SDN element, provisioning new SDN element, changing the configuration of SDN services based upon the text.

Various embodiments are described, wherein the minimal machine learning language processing engine is trained using information extracted from API definitions used in the SDN element.

Various embodiments are described, wherein the minimal machine learning language processing engine implements intent based networking.

Various embodiments are described, wherein the minimal machine learning language processing engine implements one of instructions including start, stop, execute, repeat, and wait.

Various embodiments are described, further including a database storing a natural language SDN definition.

Various embodiments are described, wherein the machine learning language processing engine is configured to produce a natural language response in response to the text.

Various embodiments are described, further including a user interface configured to present the natural language response to a user.

Various embodiments are described, wherein the minimal machine learning language processing engine is configured to produce a natural language response in response to the commands from the SDN controller.

Further various embodiments relate to a method for controlling a software defined network (SDN) using human language, including: converting user speech to text a voice to text using a machine learning model; controlling the operation of a SDN controller based upon the text using a machine learning language processing engine; and controlling the operation of a SDN element based upon commands from the SDN controller produced by the machine learning language processing engine using a machine learning minimal language processing engine.

Various embodiments are described, wherein voice to text machine learning model is implemented in a management function device.

Various embodiments are described, further including training the machine learning language processing engine using information extracted from API definitions used in the SDN.

Various embodiments are described, wherein the machine learning language processing engine implements intent based networking.

Various embodiments are described, wherein the machine learning language processing engine implements one of provisioning new SDN services, changing the configuration of the SDN, changing the configuration of the SDN element, provisioning new SDN element, changing the configuration of SDN services based upon the text.

Various embodiments are described, further including training the minimal machine learning language processing engine using information extracted from API definitions used in the SDN element.

Various embodiments are described, wherein the minimal machine learning language processing engine implements intent based networking.

Various embodiments are described, wherein the minimal machine learning language processing engine implements one of instructions including start, stop, execute, repeat, and wait.

Various embodiments are described, further including producing a natural language SDN definition.

Various embodiments are described, further including producing a natural language response in response to the text using the machine learning language processing engine.

Various embodiments are described, further including presenting the natural language response to a user on a user interface.

Various embodiments are described, further including producing a natural language response in response to the commands from the SDN controller using the minimal machine learning language processing engine.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Data models provide a structured representation of configuration and state data of telecommunication networks. With the evolution of SDN and the continuous push for generic solutions, defining generic data models rather than proprietary ones is now a reality. One of the benefits of having generic management models and protocols is the ability to develop management system solutions which can manage network with multi-vendor equipment with ease. However, having such a unified model has its own share of disadvantages, for example, the inability to realize the full capabilities of the vendor systems and the need to heavily depend on standardization to ensure successful interoperation. Key differentiators are kept in proprietary models while only aligning to the common modeling language syntax. With 5G and other advanced networks on the horizon and an explosion in the number of managed devices to data hungry consumers, this approach is not scalable. Machine learning and artificial intelligence aided network management may be used to overcome such limitations.

Embodiments of a natural language processing (NLP) powered model will be described in which the focus is on realizing use cases rather than on the structure and format of the configuration and state data of the underlying network. Structured hierarchical data models have limitations. SMIv2 (see for example, RFC 2578—Structure of Management Information Version 2 (SMIv2) and RFC 2579—Textual Conventions for SMIv2) and YANG (see for example, RFC 6020—YANG—A Data Modeling Language for the Network Configuration Protocol (NETCONF) and RFC 7950—The YANG 1.1 Data Modeling Language) are typical examples of structured data modeling for telecommunication networks. With YANG being widely adopted for management of SDNs, such languages have the various following limitations.

Use of languages such as SMIv2 and YANG have misconfiguration risks. This is the common limitation of structured data modeling representations. Historically, a high percentage of unplanned outages have resulted when incorrect changes are made and a large amount of time is spent determining what was changed to correct the problem. With shared resources and pay-for-what-you-use models on the rise, the cost of misconfiguration due to a difficulty in the understanding and representation of the management model is monetarily, operationally, and socially very high. Hence, it is desirable to significantly reduce such cost.

The use of languages such as SMIv2 and YANG limits the ability to customize the SDN. Every operator has a unique visualization of their respective networks. While a standardized model improves this situation compared to a proprietary model, it still does not deliver a fully customized solution. For example, consider the management of Quality of Service in a network element:

operator 1 may wish to have this control at a system level;

operator 2 may wish to have this at a physical interface level;

operator 3 will want this at a logical interface level.

A structured model may address this in a few ways. One is to define a standard model for one or all three cases. The other way is for vendors to define proprietary extensions. However, neither of these approaches can achieve a model that is fully aligned with every service provider's expectation.

The use of languages such as SMIv2 and YANG may lead to translation and limitations on underlying hardware capabilities. Networking functionalities are realized in application specific integrated circuits (ASICs) and Field Programmable Gate Arrays (FPGAs) in different ways by different chip vendors. The application programming interfaces (APIs) different chip vendors expose and the parameters they offer for configuration obviously differ. While implementing such features, a structured management model may not always provide all the capabilities of the underlying hardware and cannot scale to cover different underlying hardware in a system or a network. This leads to constraints, especially on chassis-based systems using hardware with multiple underlying ASICs. Extending and standardizing a structured management model to accommodate the continuous evolution will not be able to reach a stage where all capabilities of underlying hardware may be realized.

The use of languages such as SMIv2 and YANG result in complexities during database migration and introduces backward compatibility limitations. Changes in structured models typically carry backward compatibility challenges, and this prevents making changes in future models even if it is the right way to design the future model. Making changes for unavoidable cases involve obsoleting existing data model elements and expending significant effort on different components. The effort expended to avoid backward compatibility issues results in limitations which can otherwise be avoided.

The use of languages such as SMIv2 and YANG becomes complicated for bulk operations. The amount of management traffic that flows in a network is significant. When bulk operations are carried out, it involves a lot of configurations being sent or several status updates being received as the data model information is sent over the associated management protocols with a small variation in the identifier of the data model elements. For example, if a network element has 48 interfaces and the intention is to enable all of them, this scenario typically involves a request with 48 interface identifiers and the data model element that controls its administrative state. There is a lot of room for improvement in such cases to generalize such requests to reduce the bandwidth consumption of similar use cases and to reduce the likelihood of configuration errors.

Intent based networking is being deployed by major telecommunications vendors as an abstraction that can provide a business view of the network and hide the technical details of the network and its configuration. This is a step in a direction of helping the service providers to focus on the realization of end use cases and to reduce the effort spent on understanding the model and configuration details required to achieve the same. Intents combine several individual configuration steps and present the complete functionality for service providers to choose from. Such intents are very useful, for example, in real-time monitoring of large-scale software defined 5G networks. Orchestrators take care of sequencing and automating a big portion of network provisioning and management activities. The biggest benefit achieved is that operators only need to be clear on what they intend to do and not worry about the exact configurations to realize the same. However, the underlying model is still the common structure and the limitations described earlier are still retained. It is important to evolve to a machine learning assisted management to offer real-time performance monitoring, protection, and proactive care services.

Figure 1:
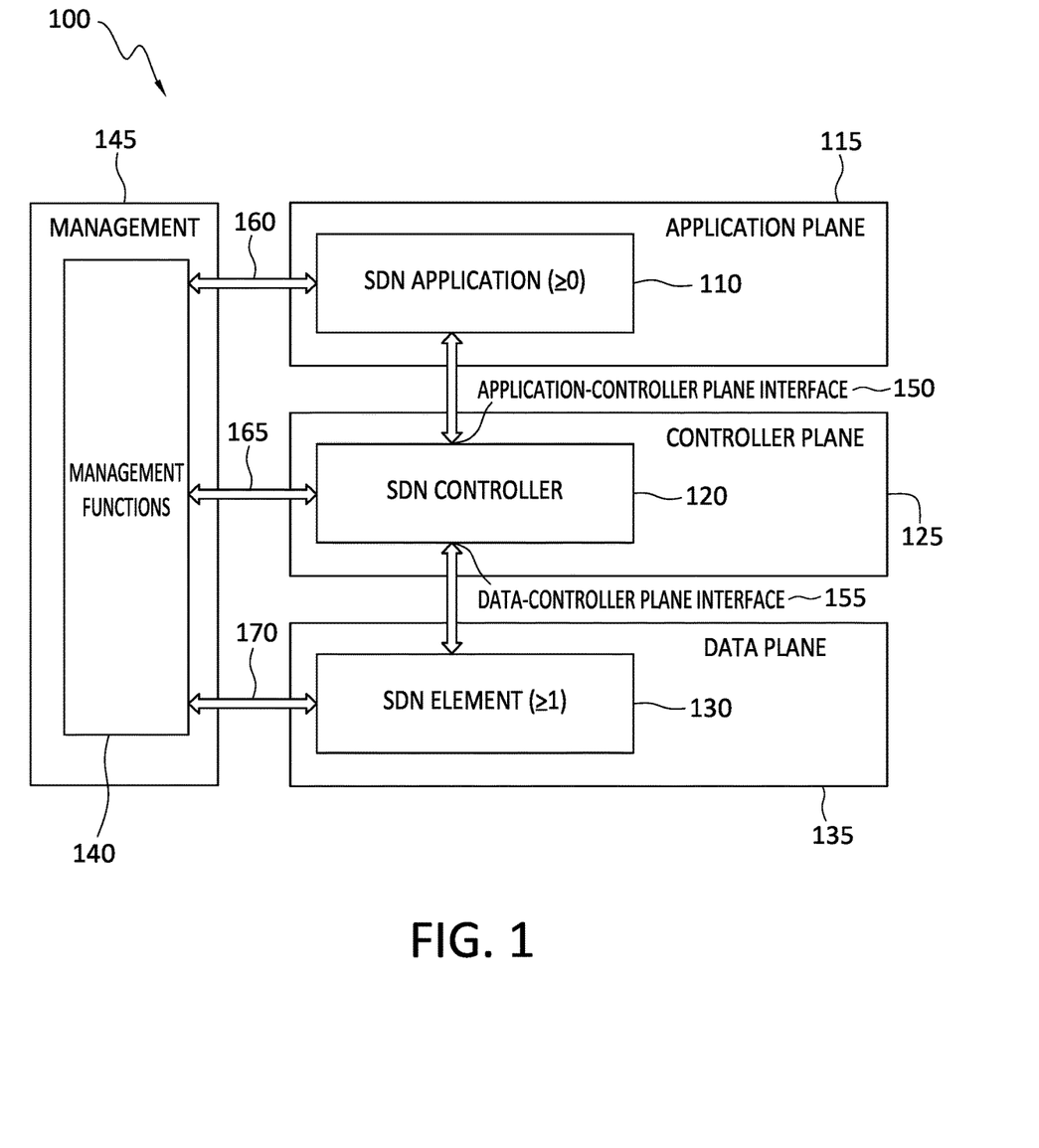
FIG. 1 illustrates the existing model for SDNs.

FIG. 1 illustrates the existing model for SDNs. The SDN 100 includes a SDN application 110, a SDN controller 120, a SDN element 130, and management functions 140. The SDN application(s) 110 operate in an application plane 115 and implement various instances of various SDN applications. The SDN controller 120 operates in a controller plane 125 and controls the operation of the SDN 100. The SDN controller 120 interfaces with the SDN application(s) 110 using an application-controller plane interface 150. The SND controller 120 interfaces with the SDN element(s) 130 using a data-controller plane interface 155. The SDN element(s) 130 provide the underlying hardware including computing and networking resources to the SDN 100. The management functions 140 operate in a management plane 145. The management functions 140 manage the configuration and operation of the SDN 100. The management functions 140 may also monitor the operation and performance of the SDN 100 and may enforce various network policies such as quality of service (QoS). The management functions may have functional interfaces 160, 165, 170 respectively with the SDN application 110, SDN controller 120, and SDN element 130.

Abstraction increases as one moves from the data plane 135 to control plane 125 to the management functions 140. The SDN element(s) 130 on its North Bound Interface (NBI) (data-controller plain interface) 155 today exposes the management protocols such as NETCONF with the database modeled using the YANG language. The SDN controller 120 on its NBI (controller-network functions interface) 165 towards the management functions 140 also exposes APIs for managers to access and manage the underlying network. The embodiments described herein will focus on the data-controller plane interface 155 and the SND controller-network functions interface 165 for the solution described.

The evolution of network management models over the years have been with the primary goal of communicating the instructions of the people managing the network to the elements in the network. A structured language was required for this because the machines lacked the capability to understand human language that may be used to control or describe the SDN. With advances in machine learning and artificial intelligence, this limitation is fast becoming a thing of the past. This opens avenues for increasing the intelligence of the network.

Figure 2:
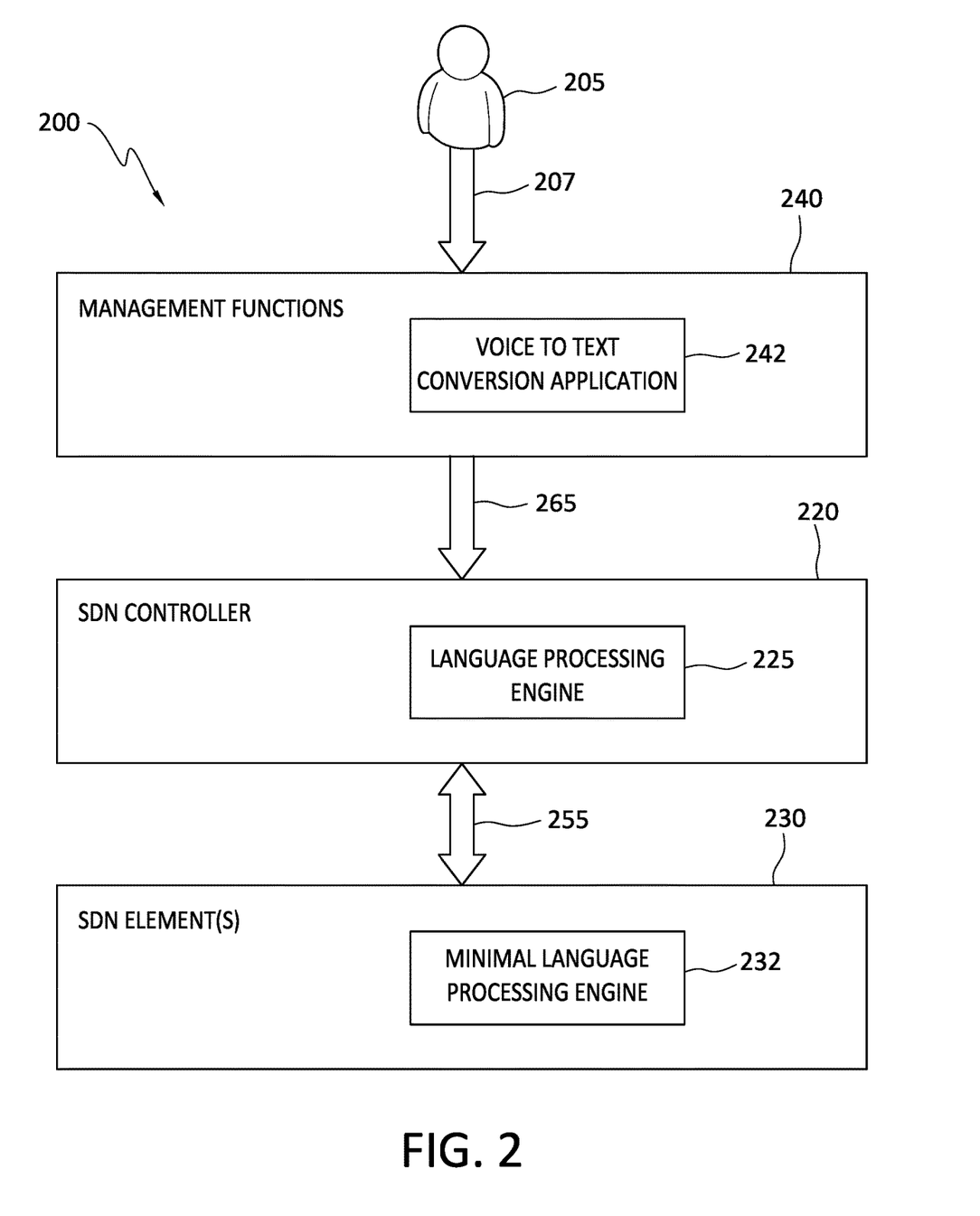
FIG. 2 illustrates a diagram of the human language SDN control system.

Embodiments of a human language SDN control system 200 will be described. FIG. 2 illustrates a diagram of the human language SDN control system 200. The human language SDN control system 200 uses human language at the NBI (controller-network functions interface) 265 of the SDN controller 220 and the NBI (data-controller plain interface) 255 of the SDN element 230 with the difference in being the level of language processing that can happen in the SDN controller 220 and SDN elements 230. For example, a user 205 may speak 207 to a voice to text conversion application 242 that is part of the management functions 240. In other embodiments a text chatbot may be used to receive input from a user 205. The voice to text conversion application 242 converts the speech to text which represents human language and sends this human language text to the SDN controller 220 using the NBI (controller-network functions interface) 265 of the SDN controller 220. The SDN controller 220 includes an language processing engine 222 that extracts intents from the human language text that can then be used to carry out various control functions. Further, the SDN controller 220 may provide commands or make data requests using human language to the SDN element(s) 230 using the NBI (data-controller plain interface) 255 of the SDN element 230. The SDN element(s) 230 may include a minimal language processing engine 232 that processes the human language message from the SDN controller 220, and the SDN elements(s) 230 may respond to the SDN controller 220 using human language as well 255. Because SDN elements 230 typically will have limited processing resources available for control purposes, the minimal language processing engine is a simpler machine learning model than the language processing engine 222. As a result, the minimal language processing engine uses less processing and performs simpler tasks.

Various elements of the human language SDN control system 200 will now be described. The management functions 240 may include a voice to text conversion application 242. The user 205 speaks to the voice to text conversion application 242 that converts the user's speech to human language text. In the embodiment using a chatbot, the user may type in text that may be used to control the SDN. Various machine learning models and techniques have been developed to convert speech to text. Any such approach may be used. For example, the voice to text conversion application 242 may record the user's speech. Then features may be extracted from the recorded speech, and these features may include, for example, extracted information from the recorded speech in the time or frequency domain. These extracted features are then fed into a trained machine learning model. Such models may include, for example, convolutional neural networks (CNN) and long short-term memory (LSTM) models using deep learning techniques. The voice to text conversion application 242 may be initially trained using a data set including various queries that a human user may speak. The training data may be focused on the specific application of controlling SDN networks or may be directed to more general speech or a combination of both.

The voice to text conversion application 242 may further use adaptive learning to update the machine learning model during use using various known techniques. The text output from the voice to text conversion application 242 is provided to the SDN controller 220 via the interface 265.

The SDN controller 220 includes a language processing engine 222. The language processing engine 222 is a controller application that may understand any human text and interpret the instruction provided. For example, the following text is received: "Enable traffic drop monitoring counters in the subscriber lines of the customers in the south zone of Chennai." The language processing engine 222 will be capable of the following:

Identifying the SDN elements that fall under the south zone of the city Chennai;

Be aware of the data plane APIs for enabling traffic drop monitoring counters (for example, this can vary from SDN element to SDN element if it is a multi-vendor environment); and Communicate to every NE, the API that must be executed. A user may enter other commands as well, for example, enable IP anti-spoofing on all the subscriber lines in slot 4 of NE a.b.c.d or upgrade software from version A to B in the NEs in south zone of Chennai and report failures.

A SDN controller vendor will obtain and use a training set to train the language processing engine 222 to achieve the ability to convert text inputs into specific control actions and commands. The language processing engine 222 may first be trained to learn the common telecommunication terminology. Such common terminology may be extracted from various databases or collections of telecommunication related documents. Next, the language processing engine 222 may be trained to process API documents in human language. This may include collecting all API documents associated with the SDN controller, and using these documents to learn various features, capabilities, and parameters associated with the API's. Various techniques may be used including the use of labelled or unlabeled training data. Further, the language processing engine 222 may use adaptive learning to be updated with new API's as they become available or are used in the SDN. Next, the language processing engine 222 may be trained to recognize what functionalities are supported and what functionalities are unsupported. Such information may be extracted from the API documents or other vendor support documents. The language processing engine 222 may also be trained to process natural error messages from different APIs and the suitable corrective actions. Again, such information may be extracted from the API documents or other related documents, but also may be extracted from various maintenance logs that the SDN may have that show errors and the corrective actions that were taken to fix the errors.

Once the language processing engine 222 is trained it may receive as input text from the voice to text conversions application 242. In the chatbot embodiment, the text may be received directly from the chatbot. The language processing engine 222 will process the text and produce various outputs based upon the requests and instructions given by the user in the text. The outputs may include configuring a new service, changing or updating an existing network configuration, provisioning new SDN elements, changing or updating existing SDN element configuration, requesting SDN, SDN element, or SDN application performance metrics and error information, etc. The outputs may also contain a natural language output that provides information in response to user's speech input. All of this will be accomplished by the user making voice or text based requests in human language that the language processing engine 222 will then understand and respond to properly. All of this may be done with out the user needing to know precise commands and data and parameter definitions of the SDN.

The SDN element(s) 230 include a minimal language processing engine 232. The minimal language processing engine 232 is a SDN element level application which may process simple instructions such as "start, stop, execute, repeat, wait and so on". This minimal language processing engine 232 will also communicate back to the SDN controller 220 any natural language error message or alarm or any such information generated by the underlying hardware. This helps in building solutions like proactive monitoring and predictive problem resolution. The SDN controller 220 may see such messages and take automatic corrective actions like what a human user would do if the human user is reading such messages and is responsible for taking steps to address the underlying issues.

As with the language processing engine 222 described above, the minimal language processing engine 232 needs to be trained to carry out its intended functions. Such training will be similar to the training of the language processing engine 222.

A SDN element vendor will develop a training set to train the minimal language processing engine 232 to achieve the ability to convert text inputs into specific control actions and commands used by the SDN element 230. The minimal language processing engine 232 may first be trained to learn the common telecommunication terminology, especially the terminology associated with SDN elements 230. Such common terminology may be extracted from various databases or collections of telecommunication related documents. Next, the minimal language processing engine 232 may be trained to process SDN element API documents in human language. This may include collecting all API documents associated with the SDN element and using these documents to learn various features, capabilities, and parameters associated with the API's. Various techniques may be used including the use of labelled or unlabeled training data. Further, the minimal language processing engine 232 may use adaptive learning to be updated with new API's as they become available or are used in the SDN element. Next, the minimal language processing engine 232 may be trained to recognize what functionalities are supported and what functionalities are unsupported. Such information may be extracted from the API documents or other vendor support documents. The minimal language processing engine 232 may also be trained to process natural error messages from different APIs in the data plane and the suitable corrective actions. Again, such information may be extracted from the API documents or other related documents, but also may be extracted from various maintenance logs that the SDN element may have that show errors and the corrective actions that were taken to fix the errors.

The human language SDN control system 200 may also include a database with a natural language summary of the SDN network configuration. Further, this natural language summary of the SDN network configure may replace a binary or unique structured database that describes the configuration of the SDN network. Further, a collection of natural language summaries may be used to fully describe the SDN network. Such a description will use natural language that a user can easily understand. For example a SDN network may be described as: The SDN element "a.b.c.d" is offering triple-play services to 48 subscribers. It has ip anti-spoofing enabled on all active subscriber lines. It also has serial number based authentication configured for all the ONTs connected. Half of the subscribers are using a 1 Gb s downstream connection while the rest are yet to be brought into service"

Another example of an SDN summary may be: The SDN element "a.b.c.d" has 4 access control lists configured on the uplink. The access control lists allow access to the logical interface on port 22 only form the IP address 1, 2, 3 and 4. Yet another example of an SDN summary may be: The SDN element has a password policy that allows a minimum password length of 8 characters with at least one uppercase, one lowercase, one number and one special character.

Such a summary may be generated from a structured database using natural language processing. Likewise, it would be possible for a language processing engine to read back such a summary and make a SDN element operational. Further, as language processing engine 222 and minimal language processing engine 232 provision and configure the SDN, these various actions may be captured and used to generate or add to the summary. The entire focus is on getting the real meaning or intention across directly rather than doing translation from one form to another and still requiring a human being to interpret the result.

Now an example will be provided that will demonstrate how to implement the human language SDN control system 200. The example provided will be simplified in order to easily demonstrate the steps needed to implement the human language SDN control system 200.

The example implementation of the human language SDN control system 200 may use various machine learning techniques including the following. Conversational generative chatbots that may be used to implement interaction between a user and the human language SDN control system 200. These chatbots are not built with predefined responses. Instead, they are trained using a large number of previous conversations, based upon which responses to the user are generated.

Text to vectorized sequence processing takes input text and converts phrases into a sequence of vectors. Phrases that have similar or identical meeting map to the same or nearby vectors. Various known text to vectorized sequence tools are available and may be used to implement this functionality.

Reinforcement learning models are machine learning models that seek to take actions that maximize the notion of cumulative reward. Typically a Markov decision process (MDP) is used to model the process. For example, an intelligence may be tasked to treat an increase in CPU load as a negative result and decrease in CPU load as a positive result when it is determining the optimal configuration for a QoS profile for CPU handled traffic using reinforcement learning.

Long Short Term Memory (LSTM) is an artificial recurrent neural network (RNN) architecture used in the field of deep learning. Unlike standard feedforward neural networks, LSTM has feedback connections. LSTMs can not only process single data points (such as images), but also entire sequences of data (such as speech or video). For example, LSTM is applicable to tasks such as speech recognition. A common LSTM unit is composed of a cell, an input gate, an output gate and a forget gate. The cell remembers values over arbitrary time intervals and the three gates regulate the flow of information into and out of the cell.

A convolutional neural network (CNN) is a type of deep neural network. CNNs use a shared weights and a translation invariant architecture. They may be used in language processing.

Deep learning is a machine learning method that is based on neural networks that use many layers. Such learning may be supervised, semi-supervised, or unsupervised. Rectified Linear Units (ReLU) may be use as activation layers in neural networks.

Word embedding is similar to text to vectorized sequence processing, but focuses on individual words. Word embedding is a method of representing text in which each word in the vocabulary is represented by a real-valued vector in a high-dimensional space. These vectors are learned in such a way that words that have similar meanings will have similar representations in the vector space.

A simple realization of the language processing engine 222 has been done using TensorFlow in Python as a chatbot. The minimal language processing engine 232 may be realized in a similar manner. The implementation of this proof of concept just returns the name of the API(s) to be executed matching the natural language request received. In a real system, this would be the actual execution of the API. Further, in a real system other output would also be generated as appropriate based upon the user input. The following steps may be used to create a machine learning model.

First, a dataset may be created using the following labels in each record. This step is done by just extracting the list of APIs from the API document of the underlying hardware provided by its vendor. This will be used for the supervised learning with the labelled dataset. The following labels may be used:
  prompt—a list of expected language phrases ("can you create", "would you make an instance of", "configure a", "show a list of")—normal English sample request created by the designers to train the model;
  domain—for example physical, switching, routing etc.;
  category—one of the following actions: create; retrieve; update; execute (actions like start stop repeat etc.); delete; unknown (for requests the intelligence is unable to classify as it is not part of the dataset);
  API—name of the API;
  arguments—tuples of names and types (<<name>>, <<type>>); and
  validated—yes (or) no—decided by the designers of the system; this field is used to realize the functionality of not blocking an unsupported functionality but rather execute with caution.

The dataset text is next preprocessed and cleaned up using the following steps: tokenize→lemmatize→stop word removal.

Next, the processed dataset is encoded and decoded to represent the text in a vectorized form. Now that a vocabulary of words is obtained, each of the patterns can be found and encoded into numerical form for modeling, using any of the common text encoding techniques—count vectorizer, term frequency-inverse document frequency (TF-IDF), hashing, etc. Here Tensorflow's text_to_sequence API is used to do this.

Next, the dataset is split into training and test sets in order to train the model. The test set is created to have sufficient representation in all categories.

Then, a data model is created and populated using an LSTM architecture (alternative techniques exist but for this example an LSTM architecture is used) with a CNN plus an embedding layer and plus a fully connected layer. The model is built based upon the created vocabulary. To do this, a word embedding technique is used.

Once the model has been built, the labelled training set is passed to the model followed by the testing set and accuracy is calculated until the testing set is processed and accuracy is calculated.

The trained model may then be used. The input text can be voice that is converted to text (using various known methods and tools) or typed into a chat window. Next, the text is cleaned by applying lemmatization, stemming, and removal of stop words. The resultant text is then encoded and matched with the vocabulary and tokenizer developed when the model was trained. The resultant encoded result is compared with the model to classify it into the domain and get a predicted response from the model. This prediction is used to determine the specific APi to use.

In this simple example the various tools and methods that can be used to implement fully functional language processing engine 222 are described. This language processing engine 222 will produce outputs that carry out the various tasks included in the users spoken request. In a fully functional language processing engine that outputs may include a wide variety of intents that implement various functionalities.

As mentioned above a natural language SDN summary may be generated that is included in a database summary that describes the SDN network. This may be done by using every normal language interaction that is processed to incrementally build the normal language summary as the database. An example will be described that uses a simple set of normal language commands that an operator would have provided. As previously described a SDN summary may include the following: "The NE "a.b.c.d" is offering voice, video, and internet services to 48 subscribers. It has ip anti-spoofing enabled on all active subscriber lines. It also has 802.1x based authentication configured for all the CPEs connected."

The summary may be produced incrementally based upon the following actions being taken. A first command to activate voice services on 48 lines may lead to the following being included in the summary: The system has 48 voice service subscribers. Next, the user activates video services on 48 lines so that the summary is updated to the following: The system has 48 voice and video service subscribers. Note the indication that the 48 subscribers have video services. The user then provisions internet services on 48 lines so that the summary is updated to: The system has 48 voice, video, and internet services subscribers. Next, the user enables IP antispoofing on all the 48 lines so that the summary is updated to: The system has 48 voice, video, and internet services subscribers. It has ip anti-spoofing enabled on all active subscriber lines. Finally, the user authenticates the CPEs on the 48 lines using 802.1x so that the summary becomes: The system has 48 voice, video, and internet services subscribers. It has ip anti-spoofing enabled on all active subscriber lines. The CPEs can be authenticated with 80-2.1x.

More generically the SDN summary may be built by carrying out the following steps. First, process every successful command text. Second, extract the key parameter and the value that is configured to frame a simple sentence (this simple sentence example may be part of the dataset for each API example defined earlier) using an api-database summary name (vlan, multicast . . . ) and parameters (parameter1,23). The English text would, for example, be: The system has <<<api-database summary name>>> with <<parameter1, 23 . . . >> set as <<<val1, 2, 33 . . . >>. Finally, this procedure is repeated for every action and the summary is refined accordingly.

Managing SDNs using natural language has many benefits. Such a system may reduce the risk of configuration errors. Since the configuration will be a dialogue in human language and no special skill to model the configuration will be required, the risk of misconfigurations due to lack of understanding will be greatly reduced. Misconfiguration though can still happen because of typographical errors or making the wrong request. But even this may be reduced by training the language processing engine to identify anomalies and to ask for clarification. For example, if a configuration request for a QoS profile can result in a high CPU load of which the language processing engine is already aware from the training sets classifying it as a "not recommended" vs "recommended" label, then the language processing engine may already classify it as an anomaly.

Managing SDNs using natural language allows for extreme customization. The language processing engine may not only be trained by the vendor, but also be trained by the service provider who is using it. This opens a new level of customization that is very difficult or impossible to be realized by traditional structured models. The system learns and develops a unique identity for every operator. If operator A wants restrictions 1, 2, 3, 4 and 5 and operator B wants restriction 3, 4 but a modified version of 5, it will involve only training the language processing engine in the SDN controller to do this. There will be no need for an extension of the management model or new software development from the equipment vendor.

Managing SDNs using natural language allows full utilization of the systems capability. Lack of a data model element which represents an underlying data plane functionality will no longer be a limitation. The operators just need to know the capabilities of the underlying data plane and instruct the controller in human language. Unless the functionality has been explicitly blocked by the vendor, the full capability of the product is usable. This is a change from a "use what is allowed by the equipment vendor" to "use whatever is not blocked by the equipment vendor."

Managing SDNs using natural language allows for the use of SDN summaries in a database that describe the network. The database no longer needs to be a hierarchical relationship tree or any other structured form. It can just be a summary in natural language as shown in the examples above.

Further, managing SDNs using natural language allows for optimized bulk operations. The structured data model when used to create multiple instances of the same table for example with minor modifications must send the full path identifier with the new key multiple times. For example, if a network element has 48 interfaces and the intention is to enable all of them, this typically involves a request with 48 interface identifiers and the data model element that controls its administrative state. Instead in the natural language model this can be stated as follows: "Bring 48 interfaces in the card in slot 2 online." It is of course possible to define a slot level parameter in a structured data model to do this. But as discussed in the customization scenario, it takes time and effort to put this into place while it could be the same underlying API that is used. Another point to note is that such combinations increase exponentially as the complexity of the SDN element and offered functionalities increase exponentially, and natural language will help scale at speed.

Managing SDNs using natural language also helps with the management of security aspects of the SDN. Security aspects such as authenticating someone's' voice may be required. There are also aspects of someone trying to trick the system by using confusing language or any other natural language in play. The training set of the language processing engine must be good enough to ensure that confusing text does not result in a system going offline. This is the same as validation checks put in place for structured data models. It is essential to remember that only the medium of management has changed and the underlying protections required cannot be forgotten. They must be adapted and modified to suit the new method. As stated, many times, the goal is to communicate with the network quickly to get the use cases realized with reduced overhead.

Managing SDNs using natural language and has cost benefits. The cost benefits come from the ability to avoid spending on training to learn new models and studying configuration guides. An automation script that consists of a few thousand lines of code will now be a plain English or suitable language document. For example, the following will be a script instead of something written in Python or Perl:

Enable all interfaces in the third slot;
When traffic starts to flow, monitor the anti-spoofing counters for five minutes;
Check whether the counter has incremented;
If it has, calculate the percentage of dropped packets for the same five minutes; and
Repeat the test three times with three different rates.

5G and other modern networks with billions of network elements are encumbered by the delays and costs of a standardized and continuously evolving structured models. It is time for large scale network management to embrace the solutions offered by machine learning and artificial intelligence and achieve the end goal of not only providing communication facilities between people of the world but also efficient communication channels between the people and the machines that are the backbone of the internet.

Figure 3:
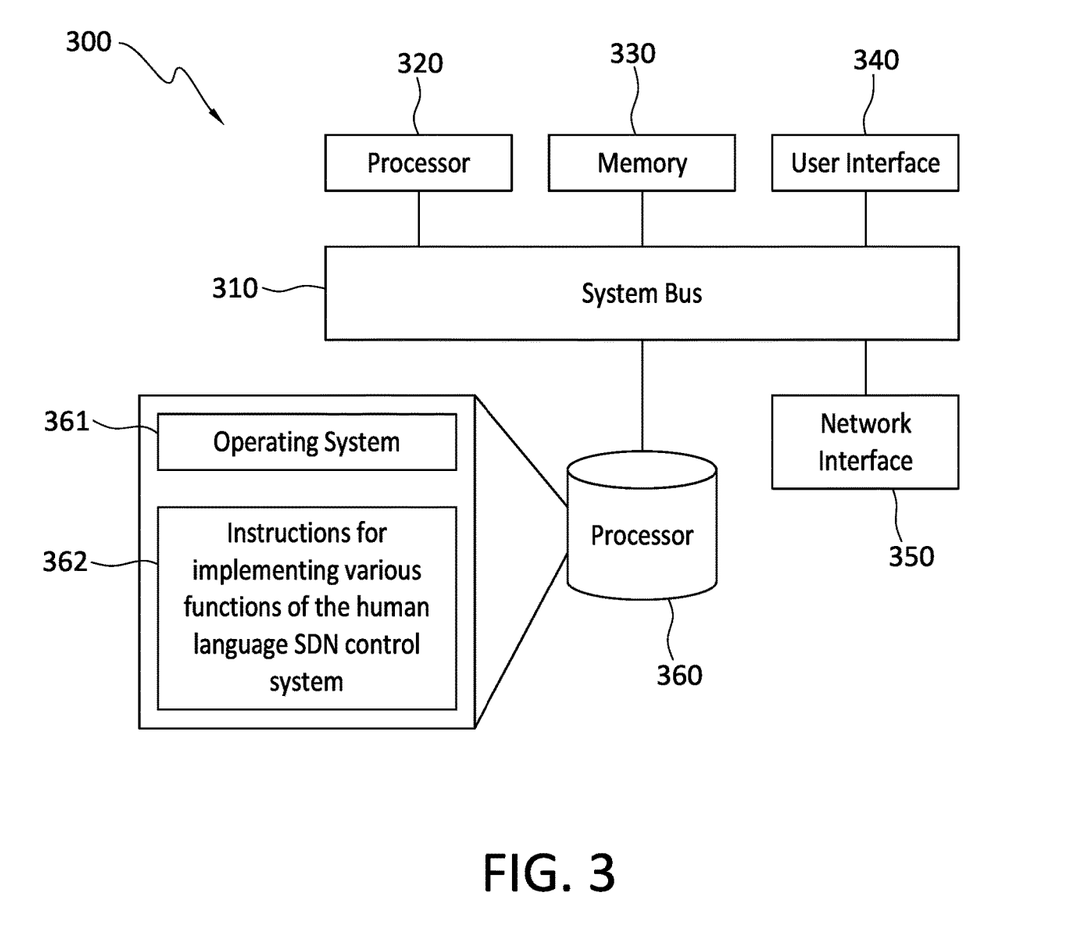
FIG. 3 illustrates an exemplary hardware diagram that may be used to implement the SDN applications, SDN controller, SDN element, the management functions, the voice to text conversion application, language processing engine, or the minimal language processing engine.

FIG. 3 illustrates an exemplary hardware diagram that may be used to implement the SDN applications 110, SDN controller 120, SDN element 130, the management functions 140, the voice to text conversion application 242, language processing engine 222, or the minimal language processing engine 232. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware processing device capable of executing instructions stored in memory 330 or storage 360 or otherwise processing data. As such, the processor may include a microprocessor, a graphics processing unit (GPU), field programmable gate array (FPGA), application-specific integrated circuit (ASIC), any processor capable of parallel computing, neural network processor, or other similar devices.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices.

The user interface 340 may include one or more devices for enabling communication with a user and may present information to users. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon which the processor 320 may operate. For example, the storage 360 may store a base operating system 361 for controlling various basic operations of the hardware 300. The storage 362 may store instructions for implementing the SDN applications 110, SDN controller 120, SDN element(s) 130, management functions 140, voice to text conversion application 242, language processing engine 222, or minimal language processing engine 232.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

The system bus 310 allows communication between the processor 320, memory 330, user interface 340, storage 360, and network interface 350.

While the system 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Such plurality of processors may be of the same or different types. Further, where the device 300 is implemented in a cloud computing system, the various hardware components may belong to separate physical systems. For example, the processor 320 may include a first processor in a first server and a second processor in a second server.

The human language SDN control system 200 described herein solves the technological problem of managing increasingly complex SDNs. The human language SDN control system 200 allows a user to use human language commands that are then converted into commands, parameters, configurations, etc. that configure, modify, provision, and specify SDNs. Using machine learning models and intent based networking, a user may more naturally manage and control a SDN, providing many of the benefits described above and avoiding many of the challenges also described above.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A human language software defined network (SDN) control system, comprising:
    a voice to human language text machine learning model configured to convert user speech to human language text;
    a machine learning language processing engine configured to control the operation of a SDN controller based upon the human language text; and
    a machine learning minimal language processing engine configured to control the operation of a SDN element based upon human language text commands from the SDN controller produced by the machine learning language processing engine.

2. The human language SDN control system of claim 1, wherein voice to text machine learning model is implemented in a management function device.

3. The human language SDN control system of claim 1, wherein the machine learning language processing engine is trained using information extracted from API definitions used in the SDN.

4. The human language SDN control system of claim 1, wherein the machine learning language processing engine implements intent based networking.

5. The human language SDN control system of claim 1, wherein the machine learning language processing engine implements one of provisioning new SDN services, changing the configuration of the SDN, changing the configuration of the SDN element, provisioning new SDN element, changing the configuration of SDN services based upon the text.

6. The human language SDN control system of claim 1, wherein the minimal machine learning language processing engine is trained using information extracted from API definitions used in the SDN element.

7. The human language SDN control system of claim 1, wherein the minimal machine learning language processing engine implements intent based networking.

8. The human language SDN control system of claim 1, wherein the minimal machine learning language processing engine implements one of instructions including start, stop, execute, repeat, and wait.

9. The human language SDN control system of claim 1, further comprising a database storing a natural language SDN definition.

10. The human language SDN control system of claim 1, wherein the machine learning language processing engine is configured to produce a natural language response in response to the text.

11. The human language SDN control system of claim 10, further comprising a user interface configured to present the natural language response to a user.

12. The human language SDN control system of claim 1, wherein the minimal machine learning language processing engine is configured to produce a natural language response in response to the commands from the SDN controller.

13. A method for controlling a software defined network (SDN) using human language, comprising:
    converting user speech to human language text using a voice to human language text machine learning model;
    controlling the operation of a SDN controller based upon the human language text using a machine learning language processing engine; and
    controlling the operation of a SDN element based upon human language text commands from the SDN controller produced by the machine learning language processing engine using a machine learning minimal language processing engine.

14. The method of claim 13, wherein voice to text machine learning model is implemented in a management function device.

15. The method of claim 13, further comprising training the machine learning language processing engine using information extracted from API definitions used in the SDN.

16. The method of claim 13, wherein the machine learning language processing engine implements intent based networking.

17. The method of claim 13, wherein the machine learning language processing engine implements one of provisioning new SDN services, changing the configuration of the SDN, changing the configuration of the SDN element, provisioning new SDN element, changing the configuration of SDN services based upon the text.

18. The method of claim 13, further comprising training the minimal machine learning language processing engine using information extracted from API definitions used in the SDN element.

19. The method of claim 13, wherein the minimal machine learning language processing engine implements intent based networking.

20. The method of claim 13, wherein the minimal machine learning language processing engine implements one of instructions including start, stop, execute, repeat, and wait.

21. The method of claim 13, further comprising producing a natural language SDN definition.

22. The method of claim 13, further comprising producing a natural language response in response to the text using the machine learning language processing engine.

23. The method of claim 22, further comprising presenting the natural language response to a user on a user interface.

24. The method of claim 13, further comprising producing a natural language response in response to the commands from the SDN controller using the minimal machine learning language processing engine.

* * * * *